United States Patent [19]

Jankowiak

[11] 4,168,593

[45] Sep. 25, 1979

[54] METHOD FOR STABILIZING SOIL

[75] Inventor: Erwin M. Jankowiak, Sanford, Mich.

[73] Assignee: The Dow Chemical Company, Midland, Mich.

[21] Appl. No.: 760,900

[22] Filed: Jan. 21, 1977

[51] Int. Cl.$^2$ .............................................. E02D 3/12
[52] U.S. Cl. ........................................... 47/58; 47/9; 111/1; 47/DIG. 10; 106/900; 260/29.6 H; 405/264
[58] Field of Search ................ 106/287 SS; 61/36 R, 61/36 C; 47/9, 58, DIG. 10; 260/29.6 H; 111/1

[56] References Cited

U.S. PATENT DOCUMENTS

| | | | |
|---|---|---|---|
| 2,961,799 | 11/1960 | Coe | 47/9 |
| 3,056,757 | 10/1962 | Rakowitz | 47/DIG. 10 |
| 3,286,475 | 11/1966 | Adams | 61/36 C |
| 3,391,542 | 7/1968 | Herrick et al. | 61/36 C |
| 3,705,467 | 12/1972 | McKnight | 47/9 |
| 3,732,698 | 5/1973 | Arora | 61/36 C |
| 3,875,697 | 4/1975 | Bracke | 47/9 |
| 3,943,078 | 3/1976 | James | 47/9 X |

Primary Examiner—Robert E. Bagwill

[57] ABSTRACT

Soil is stabilized to resist erosion due to weather exposure by depositing a latex coagulating amount of an aqueous solution of a polyvalent metal salt on the soil surface followed thereafter by depositing on that so treated surface a soil stabilizing amount of an aqueous polymer latex coagulable by said salt.

10 Claims, No Drawings

METHOD FOR STABILIZING SOIL

BACKGROUND OF THE INVENTION

Consolidation or stabilization of aggregate materials is generally undertaken to provide a tough, rigid, water permeable consolidated mass in which some structural strength is inherent. It would be extremely desirable to provide aggregate material with a degree of consolidation while allowing the consolidated mass to retain some of the characteristics of the aggregate material, e.g., water permeability and the ability to sustain growth of plant life. In order to accomplish this, it is apparent that the consolidated aggregate must be somewhat porous to allow the roots of plant life to obtain oxygen and water vital to sustain growth.

Hillsides or sandy slopes or other surface areas which are susceptible to erosion from the action of rain and wind, and on which cover growth is difficult to maintain provide an area where this invention can be of benefit.

Another area presenting the mentioned problems is in the site preparation for residential subdivisions. Frequently large areas are scarified to ease the construction problems. In the process, however, the surface becomes susceptible to wind and rain erosion.

THE PRIOR ART

A variety of techniques have been proposed for stabilizing soil against the eroding effects of high winds and heavy rainfall. One of the early methods involved treating the soil by the addition of traces of polymeric water soluble polyelectrolytes in U.S. Pat. No. 2,625,529.

Another technique described in U.S. Pat. No. 3,736,758 is one in which the soil is mixed with a binder, compacted and then coated with a water insoluble polymer.

According to U.S. Pat. No. 3,763,072 soil is stabilized by applying an aqueous acrylic polymer latex to the soil and allowing it to cure.

Other methods and techniques are shown in U.S. Pat. Nos. 3,131,074; 3,141,304; 3,268,002; 3,286,475; 3,367,892; 3,417,567; 3,495,412; 3,545,130; 3,677,014; and 3,705,467.

The use of polymer latexes is described in U.S. Pat. Nos. 2,854,347; 2,961,799 and 3,174,942.

DESCRIPTION OF THE INVENTION

The present invention is directed to a method for minimizing the erosion of soil caused by wind and rain. The method involves a two step procedure whereby an aqueous solution of a polyvalent metal coagulant is deposited on the surface in an amount to penetrate the soil surface to at least a few millimeters. Thereafter an aqueous polymer latex which is unstable to polyvalent metal salts is deposited on the coagulant treated surface. The thusly stabilized soil is considerably more resistant to wind and rain erosion than is soil that has been stabilized by direct application of latex alone.

The method is useful on dry soil, hot soil, moist soil or cold but unfrozen soil. Preferably the method is conducted on dry or moist soil at a temperature above about 60° F. Its use is successful on sand, loam and clay soils.

In the present method, all aqueous polymeric latexes capable of coagulation by polyvalent metal salts may be used. Especially useful are the aqueous latexes of the interpolymers of an alkenyl aromatic monomer, an open chain conjugated aliphatic compound and an unsaturated monocarboxylic acid.

By the term, alkenyl mononuclear aromatic monomer, it is intended to include those monomers wherein an alkenyl group is attached directly to an aromatic nucleus containing from 6 to 10 carbon atoms. Those monomers are intended to include alkyl- or halosubstituted compounds. Typical of these monomers are styrene, orthometa-, and para-methylstyrene, ortho-, meta-, and para-ethylstyrene, ortho-, para-dimethylstyrene, ortho-, para-diethylstyrene, para-chlorostyrene, isopropylstyrene, ortho-methyl-para-isopropylstyrene, ortho-, para-dichlorostyrene, vinylnaphthalene, and diverse vinyl(alkylnaphthalenes) and vinyl(halonaphthalenes). The term is also intended to include comonomeric mixtures of styrene with α-methylstyrene or one of the above-named alkenyl mono-nuclear aromatic monomers. Because of their availability and their ability to produce desirable polymers and for other reasons, it is preferred to use styrene or vinyl toluene as the monovinyl aromatic monomer.

By the term, open-chain aliphatic conjugated diene having from 4 to about 9 carbon atoms, it is meant to include, typically, butadiene-1,3; 2-methyl-butadiene-1,3; 2,3-dimethylbutadiene-1,3; piperylene; 2-neopentyl-butadiene-1,3; and other hydrocarbon homologs of butadiene-1,3, and, in addition, the substituted dienes, such as 2-chlorobutadiene-1,3, 2-cyanobutadiene-1,3; the substituted straight chain conjugated pentadiene, the straight and branch chain hexadiene, and others having from 4 to about 9 carbon atoms. The butadiene-1,3 hydrocarbons, because of their ability to produce particularly desirable polymeric materials, are especially advantageous. Butadiene-1,3 which is inexpensive, readily available, and produces interpolymers having excellent properties is preferred.

The monoethylenically unsaturated acid derivative may be selected from a wide variety of compounds, such as carboxylic acids, and anhydrides. It is imperative that the acid derivative be copolymerizable with the other monomers and that it be an acid or hydrolyzable to an acid. Typical examples of these derivatives are itaconic acid, acrylic acid, vinyl sulfonic acid, vinyl benzoic acid, and isopropentyl benzoic acid. Mixtures of two or more such monothylenically unsaturated acid derivatives may be used if desired.

The diolefin should constitute from at least 40 percent by weight of the total weight of monomers used. The alkenyl aromatic monomer should constitute less than 60 percent by weight of the total weight of monomers and the monoethylenically unsaturated acid derivative should be present in amounts of from 2 to 10 percent by weight of the total weight of monomers. Polymers have compositions outside of the above stated limits generally have one or more undesirable properties which make them unsuitable for use in the instant invention.

Many other polymer latexes are available commercially and may be used herein. Typical of those are the homopolymers and interpolymers of the vinyl alkanoates such as vinyl acetate, and the esters of acrylic or methacrylic acid.

The latexes must be coagulable by polyvalent metal ions. Many latexes are post stabilized against coagulation by electrolytes and, in general, such latexes either require impractical amounts of polyvalent metal ions or are little better in stabilizing the soil than by direct application of the latex onto the soil. The coagulability of a latex may be easily evaluated by simple routine tests involving a small aliquot of the latex.

Most latexes as sold commercially have from about 30 to about 50 weight percent polymer solids. The latexes will function in the inventive concept at that concentration, but it is uneconomical to do so. Preferably the latex is diluted to from about 2 to about 10 weight percent solids.

The procedure involves depositing, as for example by spraying, an aqueous solution of from about 3 to about 15 weight percent concentration of a polyvalent metal salt on the surface of the soil and in a quantity of solution to penetrate at least a few millimeters into the soil. Generally a minimum amount of about 200 pounds of salt per acre is required to achieve optimum stabilization.

Subsequently, and preferably before the soil has dried from the salt deposition, the latex is deposited as by spraying or other conventional technique onto the salt treated soil in an amount to penetrate the soil to about the same depth as the coagulant. Generally about 200 pounds of latex solids per acre is required to achieve the stated benefits.

The coagulant and latex penetrate the soil surface so that the latex solids are distributed throughout a finite layer of soil. The actual depth of penetration can be varied by the dilution of the ingredients, the amount applied and the type of soil. The depth of the layer that is needed will depend to a large extent on the useage that will be made of the treated surface. For example, if vehicular traffic is to traverse the surface, the layer will have to be much thicker than if only foot traffic or no traffic will cross the surface. Generally it is difficult to secure a penetration of greater than about 2.5 centimeters by conventional application techniques.

It is also possible to include in the latex prior to deposition on the soil grass seeds, fertilizer, herbicides such as preemergence crabgrass killer or other things used to provide a ground cover. Also the latex may be colored for ease of application.

The invention will be illustrated by the following non-limiting examples.

EXAMPLE 1

An aqueous aluminum sulfate solution is sprayed onto a non-compacted 24B type soil having a 1 to 1 silt/sand ratio. After drying, the soil was sprayed with a latex and dried under ambient conditions for 48 hours. The specimens were prepared in standard laboratory sieves.

The specimens were placed 36 inches under five syringes with hypodermic needles arranged to drop water droplets onto the soil surface. The test was continued until the droplets formed a depression in the surface or caused a surface break. The total amount of water was recorded.

One latex used was an interpolymer of 48 weight percent styrene, 50 weight percent butadiene, and 2 weight percent itaconic acid made with carbon tetrachloride as a chain stopper and with a mixture of sodium dodecyl phenoxy benzene sulfonates consisting of about 75 percent monoalkylated and about 25 percent dialkylated products.

Another latex used was of a vinylidene chloride interpolymer.

The results are shown in the following Table I.

TABLE I

| Sample No. | % $Al_2(SO_4)_3$ Solution | lb/acre | Latex % Solids | lb/acre | Surface Break in g. $H_2O$ |
|---|---|---|---|---|---|
| Styrene/Butadiene/Itaconic Acid Latex | | | | | |
| 1 | no | no | 5.0 | 400 | 1,825.0 |
| 2 | 8.0 | 535 | 5.0 | 400 | 11,365.0 |
| 3 | 8.0 | 535 | 7.5 | 400 | 10,000.0 |
| 4 | 10.7 | 535 | 5.0 | 400 | 12,000.0 |
| Saran Latex | | | | | |
| 5 | no | no | 5.0 | 400 | <400.0 |
| 6 | 8.0 | 535 | 5.0 | 400 | 6,072.0 |

EXAMPLE 2

In a manner similar to the previous example the styrene/butadiene/itaconic acid latex and aluminum sulfate were varied from those percentages and applied amounts from that example.

In the simulated rain test the time to form a depression or to break the surface was recorded.

The specimens were also tested for durability to an impinging air flow. The sieves were positioned on a grade of 1.5 to 4 and air directed through a 9 by 5 inch opening onto the upper half of the mat. The air velocity was varied up to a maximum of 50 miles per hour. The velocity at which the first surface break appeared was recorded. The results are shown in Table II.

EXAMPLE 3

The effect of post stabilization of a latex was shown by employing a polyvinyl acetate latex sold commercially as Curasol onto soil in the manner previously described. Using a 5 weight percent aluminum sulfate solution applied at the rate of 200 pounds per acre and the latex at weight percentages of 2.0 to 4.0 polymer solids, the surface broke in the rain test at less than 30 seconds. That was the same result as when the latex was applied without the metal salt pretreatment.

EXAMPLE 4

The coagulation tendencies of a variety of latexes and aqueous salt solutions were evaluated. The latexes included (1) the earlier mentioned styrene/butadiene/itaconic acid polymer; (2) a copolymer of 47 weight percent styrene, 50 weight percent butadiene and 3 weight percent itaconic acid; (3) a polymer of 40 weight percent styrene, 57.5 weight percent butadiene and 2.5 weight percent itaconic acid; (4) a polymer of 57 weight percent styrene, 41 weight percent butadiene, 0.25 weight percent fumaric acid and 1.75 weight percent acrylic acid; (5) a polymer of 58 weight percent styrene, 38 weight percent butadiene and 4 weight percent acrylic acid.

The metal salts used were aluminum sulfate, ferric chloride, ferrous chloride, magnesium chloride, calcium chloride, aluminum chloride, ferrous sulfate and cupric sulfate.

The coagulation tendency and character of the coagulum of each latex was determined in glass tubes. The coagulum was rated as very hard, intermediate or soft. The very hard coagulum latexes were most satisfactory when tested in the present soil treatment method.

Latexes (1), (2), (3) resulted in very hard coagula; Latex (4) gave a soft coagulum and Latex (5) produced a coagulum of intermediate hardness. The pattern was consistent with all the electrolytes tested.

In contrast, the previously identified polyvinyl acetate latex (Curasol AE) showed very slight to no coagulation tendency with the salts.

EXAMPLE 5

Grass seed was sown on the surface of a soil. A 6 weight percent aqueous solution of aluminum sulfate was sprayed on the surface at 200 pounds per acre followed by the deposition of 47 styrene/50 butadiene/itaconic acid latex of Example 4 at a dilution to 2 weight percent solids. The latex was applied at the rate of 200 pounds per acre. After drying, the specimens were exposed to a simulated rainfall of 10 inches per hour for 15 minutes. The seeds remained attached to the soil.

By the above procedure, grass seeds were attached to soil with the latex diluted to 4 weight percent and applied at 600 gallons per acre. The seeds were not dislodged at a wind velocity of 50 miles per hour.

TABLE II

| Sample No. | % $Al_2(SO_4)_3$ Solution | Gal/ Acre | Lb/ Acre | % Latex | Gal/ Acre | Lb/ Acre | Time To Break Surface |
|---|---|---|---|---|---|---|---|
| RAIN STABILITY | | | | | | | |
| 7 | no | — | — | 4.0 | 600 | 200 | — |
| 8 | no | — | — | 8.0 | 600 | 400 | <1 min. |
| 9 | 2.5 | 960 | 200 | 4.0 | 600 | 200 | 8.7 min. |
| 10 | 3.75 | 642 | 200 | 4.0 | 600 | 200 | 10.0+ min. |
| 11 | 5.0 | 480 | 200 | 4.0 | 600 | 200 | 8.7 min. |
| 12 | 15.0 | 160 | 200 | 4.0 | 600 | 200 | 9.0 min. |
| 13 | 7.5 | 320 | 200 | 3.5 | 600 | 175 | 10.0+ min. |
| 14 | 6.0 | 400 | 200 | 3.0 | 600 | 150 | 9.5 min. |
| 15 | 3.75 | 642 | 200 | 2.5 | 600 | 125 | 9.0 min. |
| 16 | 6.0 | 400 | 200 | 2.0 | 600 | 100 | 5.0 min. |
| WIND DURABILITY | | | | | | | MPH At Surf. Break |
| 17 | n0 | — | — | 2.0 | 600 | 100 | 40–45 |
| 18 | 6.0 | 400 | 200 | 2.0 | 600 | 100 | 50+ |

What is claimed is:

1. A method for stabilizing soil to erosion due to weather exposure comprising the deposition on the soil surface of an aqueous solution of a latex coagulating amount of a polyvalent metal salt followed thereafter by the deposition on the so treated surface of a soil stabilizing amount of an aqueous polymer latex coagulable by said salt.

2. The method claimed in claim 1 wherein said aqueous solution has a concentration of from about 3 to about 15 weight percent.

3. The method of claim 1 wherein said salt is applied to said soil at a minimum amount of 200 pounds per acre.

4. The method of claim 1 wherein said salt is aluminum sulfate.

5. The method of claim 1 wherein said latex contains from about 2 to about 10 weight percent polymer solids.

6. The method of claim 1 wherein said latex is applied to said soil in an amount of at least 200 pounds of polymer solids per acre.

7. The method of claim 1 wherein said latex is of an interpolymer of styrene, butadiene and an unsaturated monocarboxylic acid.

8. The method of claim 7 wherein said acid is itaconic acid.

9. The method of claim 7 wherein said acid is acrylic acid.

10. The method of claim 1 wherein grass seed is deposited on the soil prior to deposition of said salt.

* * * * *